United States Patent
Garrett et al.

(10) Patent No.: US 6,318,483 B1
(45) Date of Patent: Nov. 20, 2001

(54) DISENGAGEABLE DRIVE ARRANGEMENT FOR AN ALL TERRAIN VEHICLE HAVING BOTH TRACKS AND WHEELS

(75) Inventors: Lawrence M. Garrett; Bart Weaver, both of Knoxville, TN (US)

(73) Assignee: Northrup Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/450,904

(22) Filed: Nov. 29, 1999

(51) Int. Cl.[7] .................................................... B62D 55/02
(52) U.S. Cl. ........................ 180/9.21; 180/9.34; 180/9.62; 180/167
(58) Field of Search .................................. 180/9.21, 9.34, 180/9.36, 9.38, 9.42, 9.62, 167, 7.1, 9.28; 301/124.1, 137

(56) References Cited

U.S. PATENT DOCUMENTS

| | | | |
|---|---|---|---|
| Re. 34,822 | * 1/1995 | Mattson | 180/11 |
| 4,621,873 | * 11/1986 | Weinstein et al. | 301/124 R |
| 4,932,831 | 6/1990 | White et al. | 414/732 |
| 5,022,812 | 6/1991 | Coughlan et al. | 414/729 |
| 5,064,011 | * 11/1991 | Ogano et al. | 180/9.22 |
| 5,421,434 | * 6/1995 | Liao | 188/1.12 |
| 5,740,875 | * 4/1998 | Wilson, Sr. et al. | 180/9.62 |

OTHER PUBLICATIONS

Remotalk vol. 2 Issue 1 pp. 1, 4, 5.
Exh. A–Photos of prior art vehicle with disconnectable drive.

* cited by examiner

*Primary Examiner*—Paul N. Dickson
*Assistant Examiner*—Avraham H. Lerner

(57) ABSTRACT

A drive arrangement for a remotely controlled unmanned ground vehicle which has both tracks and wheels. The track drive and the wheel are both connected to a drive shaft assembly which includes a spring loaded axially movable splined shaft engagable and disengagable with a motor driven gear train. A ball lock key assembly is mateable with an extraction knob located at the end of the splined shaft to quickly and effortlessly disengage the shaft to allow for free-wheeling in the event of a power failure, or like problem, and to thereafter reengage the shaft for normal operation after the problem is remedied.

13 Claims, 9 Drawing Sheets

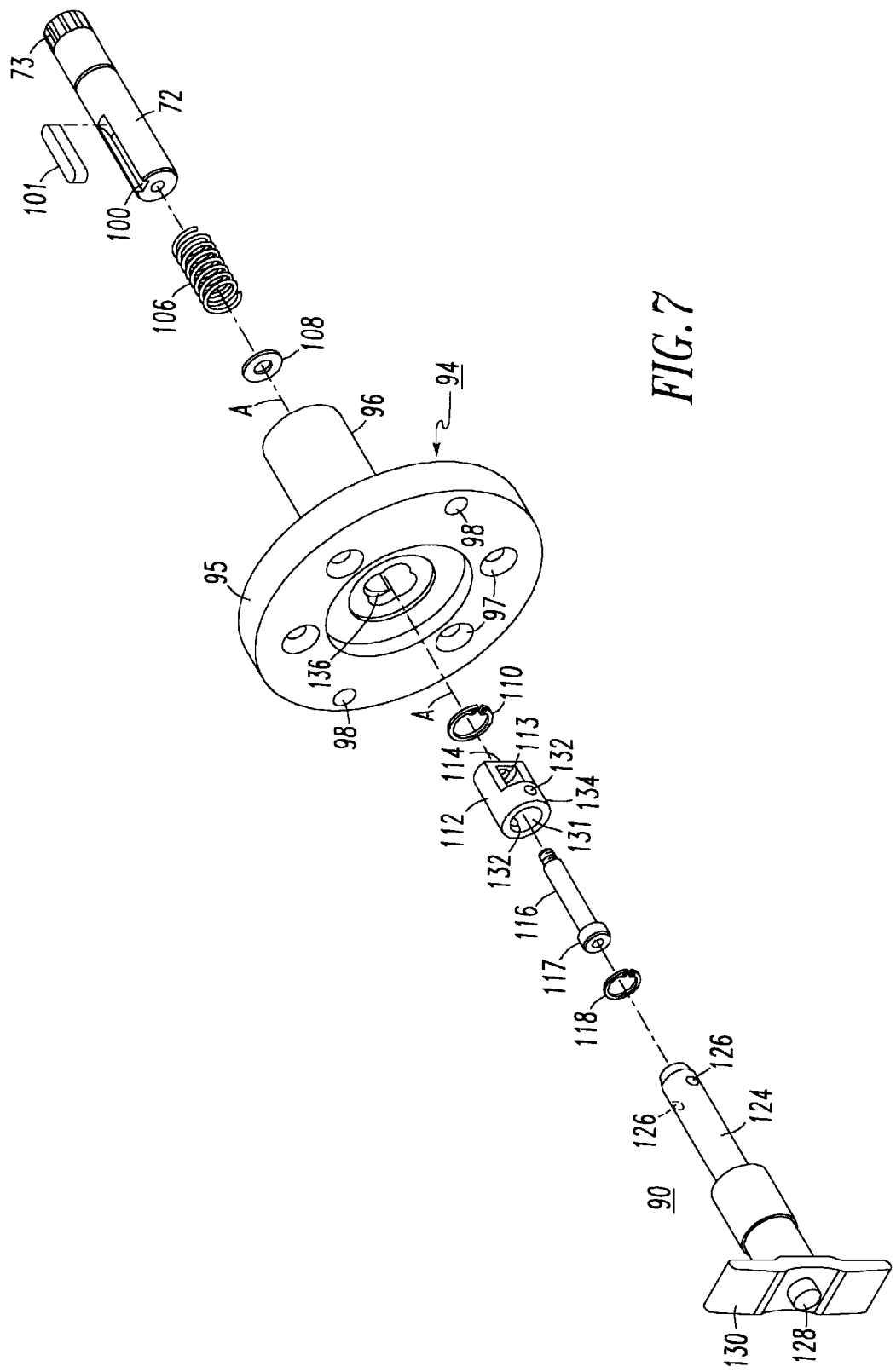

DISENGAGEABLE DRIVE ARRANGEMENT FOR AN ALL TERRAIN VEHICLE HAVING BOTH TRACKS AND WHEELS

BACKGROUND OF THE INVENTION

1. Field of the Invention

The invention in general relates to vehicles and more particularly, to remote controlled vehicles used in potentially hostile environments and which includes both tracks and wheels.

2. Description of Related Art

Unmanned ground vehicles, remotely controlled by cable or an RF link, are utilized in a variety of potentially hazardous environments. These vehicles may be used in place of humans in life threatening situations such as explosive control, mine clearance, nuclear hazards and reconnaissance in a combat area, by way of example.

Relatively large as well as small such vehicles exist, some models being designed with wheels and some with tracks, an example of the latter being described and claimed in U.S. Pat. Nos. 4,932,831 and 5,022,812, both of which are hereby incorporated by reference.

In yet another model both wheels and tracks are utilized. In this design the track is slightly elevated off the ground thus allowing the wheels to be the main drive element with the track acting as an additional tractive force when required, as on highly uneven terrain. In addition, the combination of tracks and wheels provides for a vehicle in which vibrations are decreased when running, which has greater stability in rough terrain and on stairs, and which has increased vehicle speed compared to a track-only design.

In the event of a power failure or damage to a drive unit (generally one per side) of a vehicle of the dual wheel/track design, it would be desirable to disconnect the drive unit(s) so that the vehicle may be free-wheeling for easy towing However, in order to accomplish this disconnection, a time consuming operation, involving removal of a variety of fasteners, must be performed. The present invention obviates this time consuming operation.

SUMMARY OF THE INVENTION

A disengageable drive arrangement for an all terrain vehicle is provided and includes a drive assembly which interacts with a drive shaft assembly. Connected to the drive shaft assembly is a wheel as well as a drive sprocket for an endless track. The drive assembly includes a drive shaft which is engageable and disengageable with the drive assembly. A key assembly is insertable into the drive shaft assembly and is operable to move the drive shaft into a selected one of an engageable and disengageable positions with the drive assembly. The key assembly has a quick release mechanism to allow it to be completely removed from the drive shaft assembly.

BRIEF DESCRIPTION OF THE DRAWINGS

FIG. 7 is an exploded view of a drive shaft assembly used in the embodiment of FIGS. 5 and 6.

DESCRIPTION OF THE PREFERRED EMBODIMENT

Figure 1:
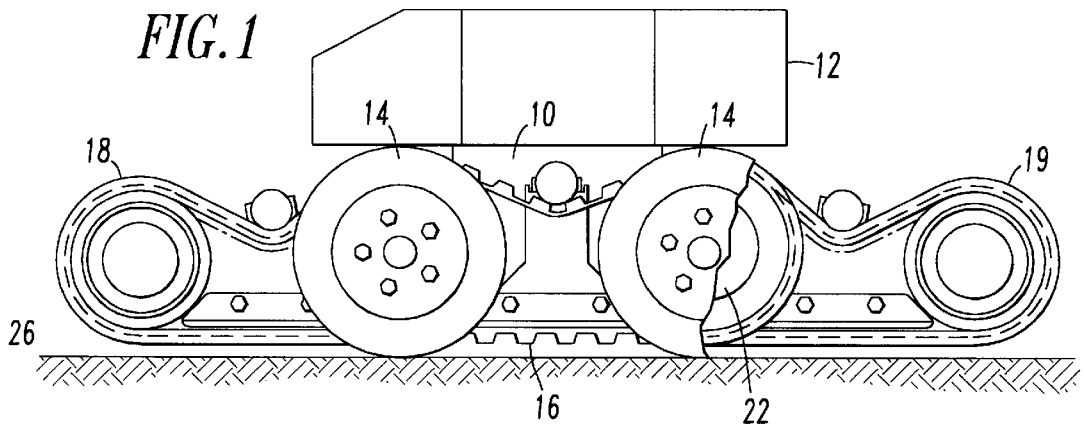
FIG. 1 is a side view of one type of remotely controlled unmanned ground vehicle.

In the drawings, which are not necessarily to scale, like or corresponding parts are denoted by like or corresponding reference numerals.

Although the invention is applicable to a variety of vehicles, it will be described, by way of example, with respect to a remotely controlled unmanned vehicle. FIG. 1 illustrates one type of remotely controlled unmanned vehicle which includes a main chassis 10 which carries a frame 12 upon which is mounted one or more mechanical arms as well as various devices (not shown) or carrying out particular hazardous missions. Details of such mechanical arms and devices are further illustrated and described in U.S. Pat. Nos. 4,932,831 and 5,022,812.

The particular vehicle illustrated in FIG. 1 includes pneumatic wheels 14, a main track 16, as well as forward and aft angularly movable auxiliary tracks 18 and 19. All of the tracks on one side of the vehicle are driven by a track drive sprocket 22, shown behind the cut-away portion of rear wheel 14. During operation over relatively hard flat terrain, wheels 14, driven by virtue of their mechanical connection to drive sprocket 22, contact the ground 26 and propel the vehicle. The wheels increase the width of the vehicle and provide greater stability in rough terrain and in climbing stairs. When traveling through gravel, deep grass, snow or other loose terrain, vehicle propulsion is aided by the track arrangement.

Figure 2:
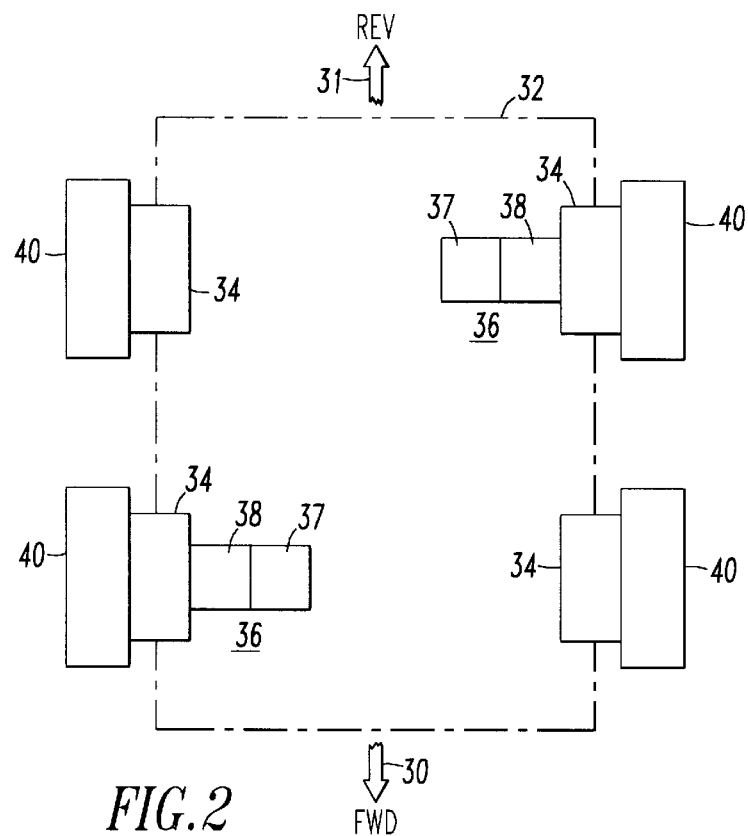
FIG. 2 is a conceptual presentation of a drive arrangement for the vehicle of FIG. 1.

FIG. 2 is a conceptual plan view of a dual track/wheel vehicle, movable in the forward direction as indicated by arrow 30, and in a reverse direction, as indicated by arrow 31. For simplicity, the vehicle does not include forward and aft auxiliary tracks. Carried by a chassis 32 are four track sprockets 34, with the eft rear and right front sprockets 34 being driven by respective drive assemblies 36. In a preferred arrangement, each drive assembly is constituted by a drive motor 37 coupled to a gear train 38.

Wheels 40 are fastened to respective sprockets 34 and the vehicle is propelled by activation of the drive assemblies 36 which turn the left rear and right front rack drive sprockets 34. The left front and right rear sprockets (and connected wheels 40) are, in turn, driven by virtue of rotation of the respective left and right main tracks (not illustrated).

Figure 3:
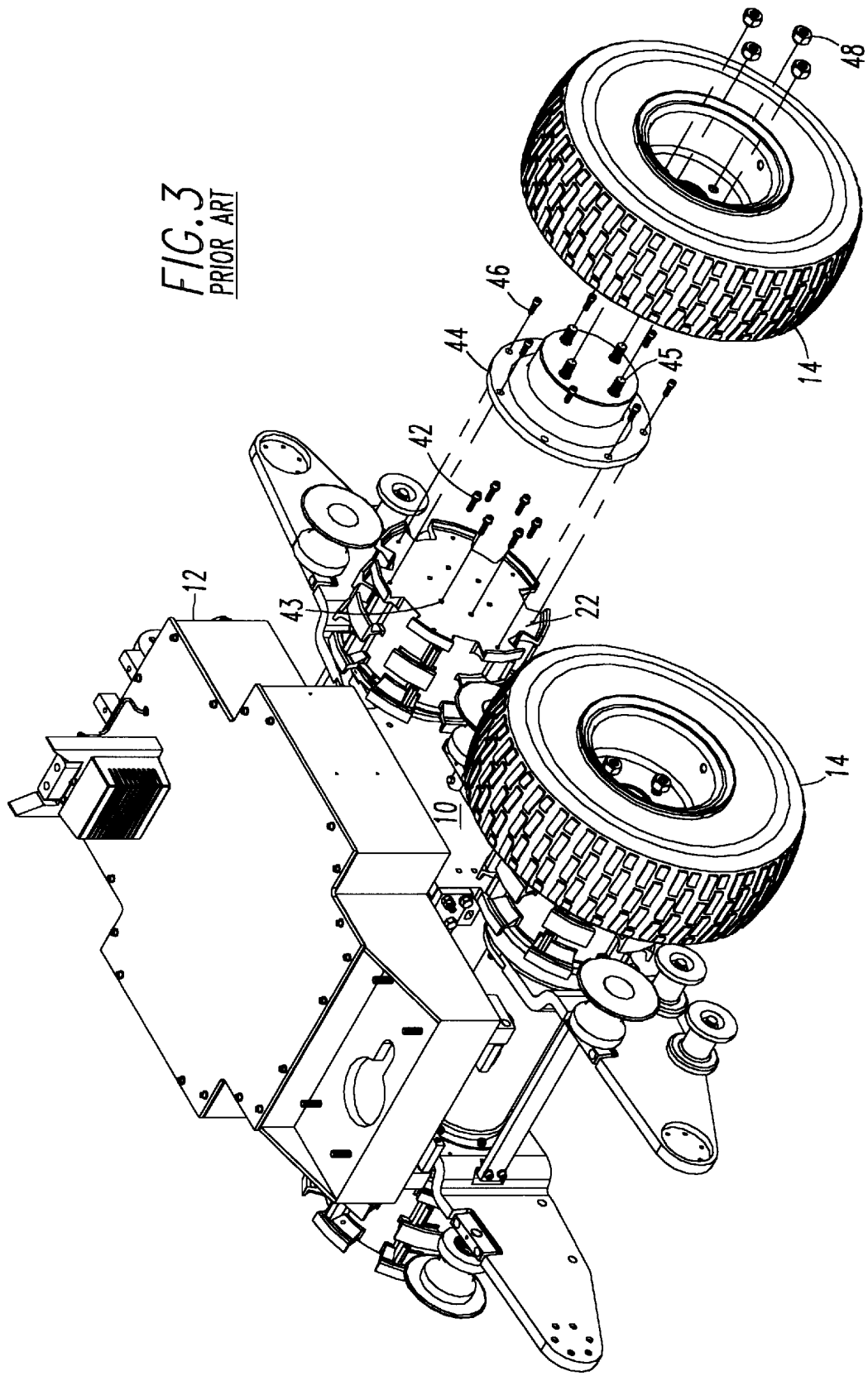
FIG. 3 illustrates the drive disconnect procedure for a vehicle as in FIG. 1.

In the event of a problem such as a power failure or damage to a drive assembly 36, it would be desirable to disconnect the drive assemblies so that the vehicle may be free-wheeling for easy towing. FIG. 3 illustrates the time-consuming disconnect process on a vehicle such as described in FIG. 1. Again, for clarity, the tracks are not shown.

Track drive sprocket 22 is driven by a planetary gear train located behind the sprocket 22, and is mechanically secured to the output gear of the gear train by means of drive screws 42 which pass through holes 43 in the sprocket.

A wheel hub 44, having projecting lugs 45, is connected to the drive sprocket 22 by means of hub screws 46, with the wheel 14 being mounted on the hub and secured in place by lug nuts 48 engaging projecting lugs 45.

To disconnect the assembly to make it free wheeling, the lug nuts 48 must be removed to remove the wheel 14. After the wheel removal, hub screws 46 are taken out to remove the hub 44 to gain access to drive screws 42, which, when removed, decouples the gear train and allows the drive sprocket 22 to turn freely. The wheel hub 44 and wheel 14 are then replaced.

Figure 4:
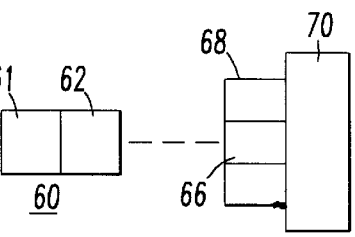
FIG. 4 is a conceptual presentation of a drive arrangement in accordance with the present invention.

After the problem has been remedied, the drive sprocket 22 must again be reconnected to the gear train. To accomplish this, the wheel 14 and hub 44 are removed. Drive sprocket 22 must be rotated until holes 43 are lined up with corresponding screw holes in the output gear of the gear train. Once this is accomplished, the parts are assembled as previously described. The present invention eliminates these time consuming steps with an arrangement which allows the vehicle to be placed into a free-wheeling mode with a single step operation. FIG. 4 is a simplified block presentation of the concept as applied to a driven track sprocket.

A drive assembly 60 is provided and in a preferred embodiment includes a drive motor 61 and a gear train 62 such as a planetary gear unit having an output gear with a splined central aperture, as will be described. The improved arrangement includes a drive shaft assembly 66, which is disengagable from the gear train 62, and which is mechanically fastened to both the track drive sprocket 68 and wheel 70.

Figure 5:
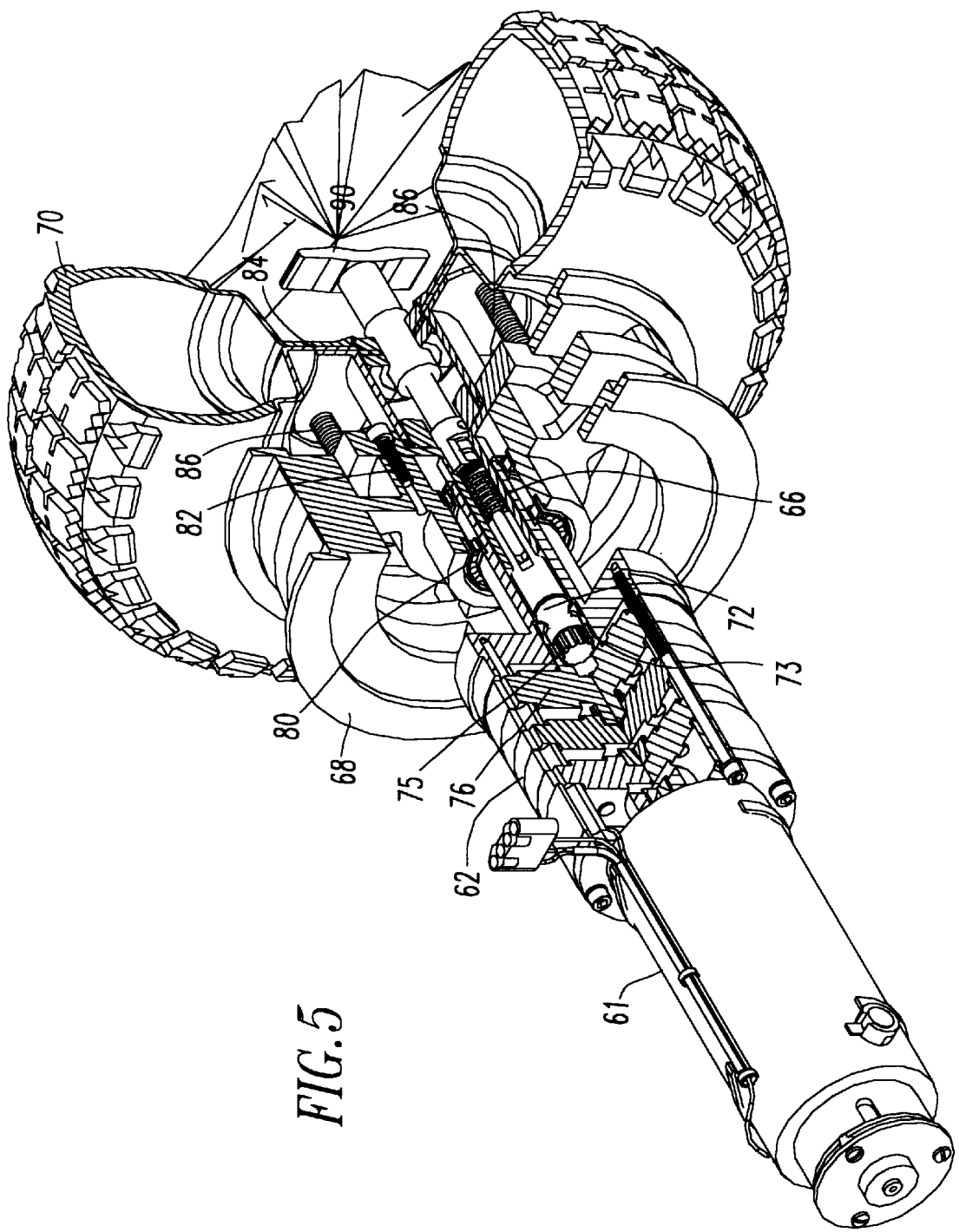
FIGS. 5 and 6 are isometric views illustrating one embodiment of the invention, and shown in partial section.

FIG. 5 is a cut-away view of the physical implementation of FIG. 4, as seen from the chassis side. The drive shaft assembly 66 includes an axially moveable shaft 72 having splines 73 which, in FIG. 5, mates with splines 75 of output gear 76 so that the drive shaft assembly 66 will be rotated by the drive assembly 60.

The drive shaft assembly 66 passes through a bearing 80 in the track drive sprocket 68 and is secured to the track drive sprocket 68 by a series of bolts 82. In addition, wheel rim 84, upon which wheel 70 is mounted, is also secured to drive shaft assembly 66 by means of lug bolts 86.

Figure 6:
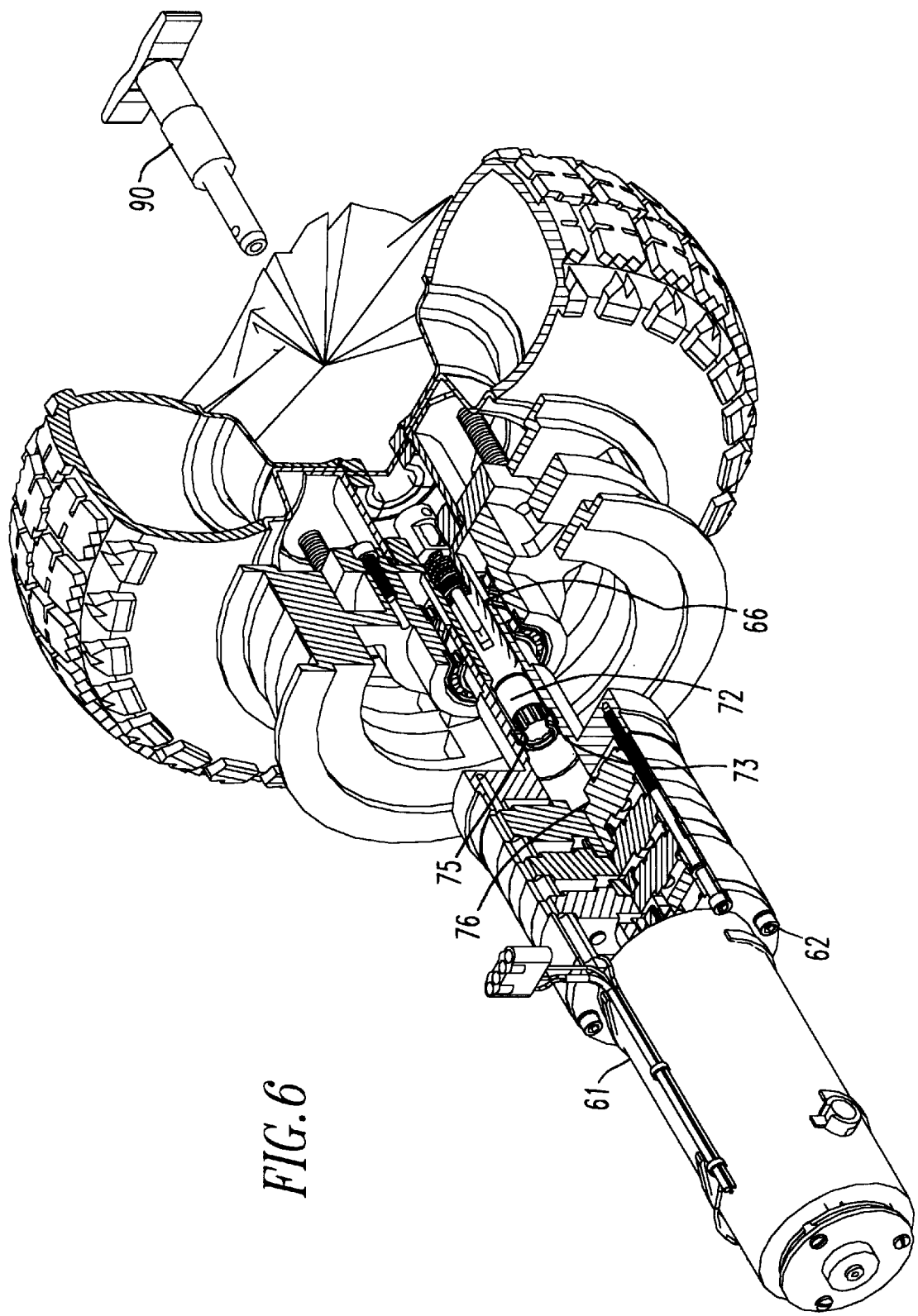
Figure 6A:
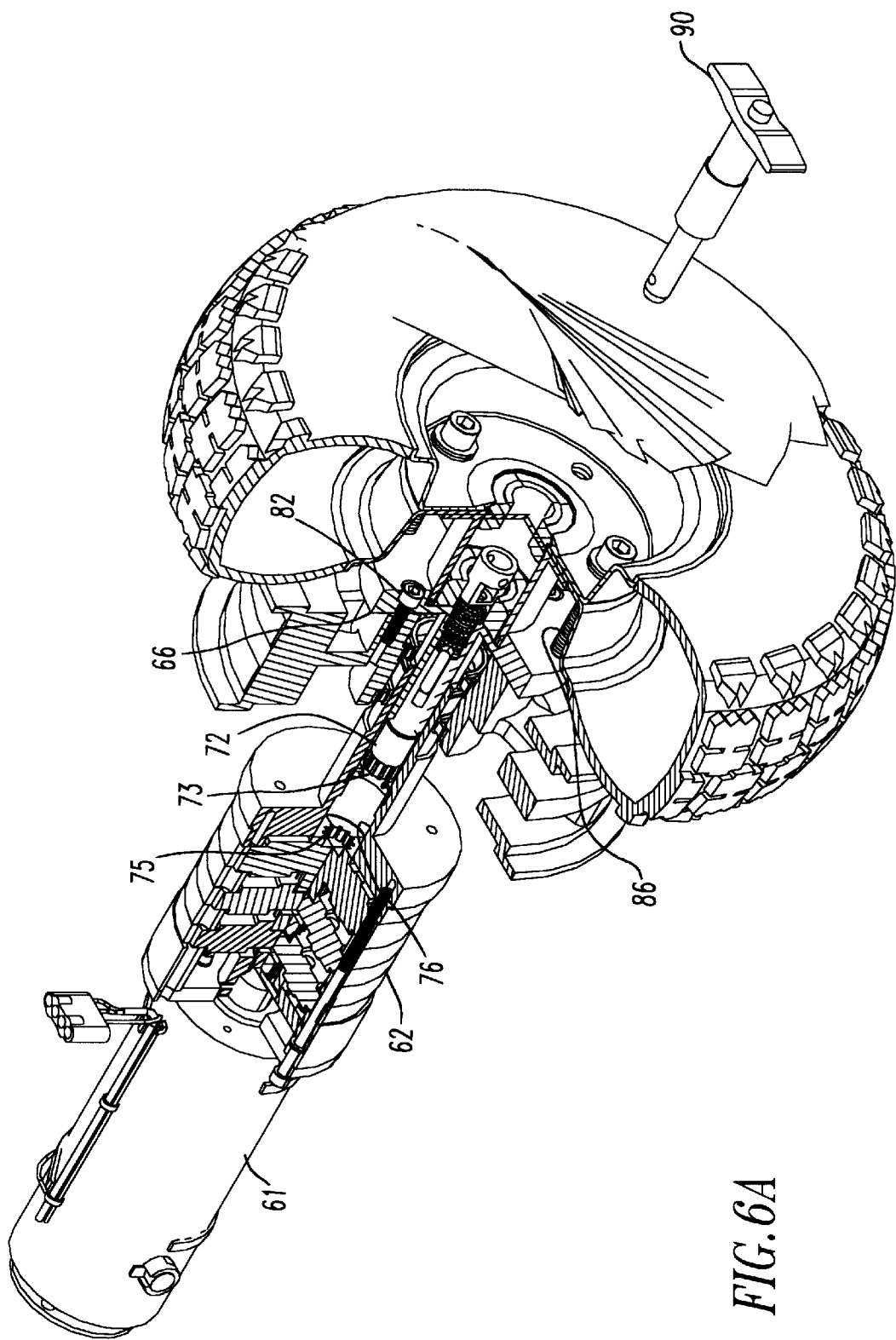
FIG. 6A is a view as in FIG. 6, as seen from another angle.

As will be explained, a key assembly 90 is inserted into the drive shaft assembly 66 to effect disengagement of the shaft 72 from the gear train 62 to allow free-wheeling. In FIG. 5 the key assembly 90 is illustrated as being inserted into the drive shaft assembly 66, through rim 84, with shaft 72 being engaged with gear train 62. FIG. 6 illustrates another mode of operation wherein the key assembly 90 is removed and the shaft 72 has been moved axially so that it is disengaged from the gear train 62. FIG. 6A illustrates the orientation of FIG. 6 as seen from the wheel side. In either case, the key assembly 90 may be permanently inserted into the drive shaft assembly 66 for all modes of operation or may be stored at a separate location, on or off the vehicle, and inserted only when an engagement or disengagement is to be performed.

Figure 7A:
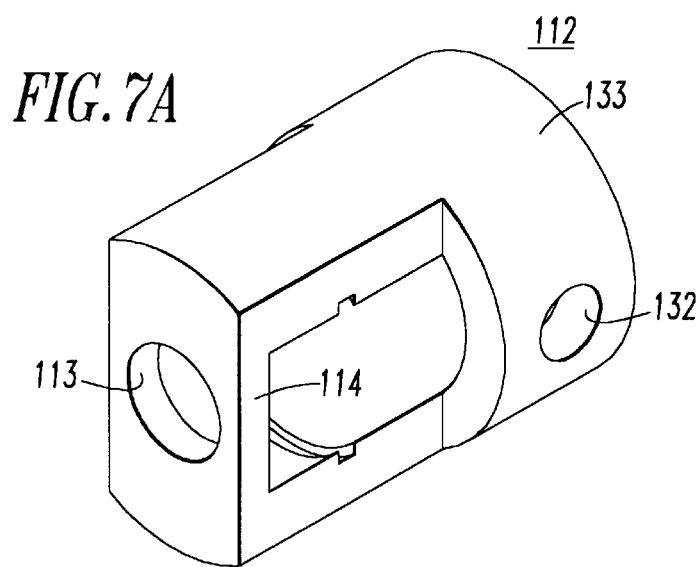
FIG. 7A is an isometric view of the extraction knob of the assembly of FIG. 7.

Additional reference is made to FIG. 7, which is an exploded view of the drive shaft assembly 66, as seen from the wheel side. The drive shaft assembly 66 includes a drive axle 94 which extends along a central longitudinal axis A and has a flange portion 95 and a coaxial hollow sleeve portion 96. Apertures 97 and 98 in the flange 95 respectively accommodate bolts 82 and 86 (FIG. 5) for connection of the track drive sprocket 68 and wheel rim 84.

Figure 8:
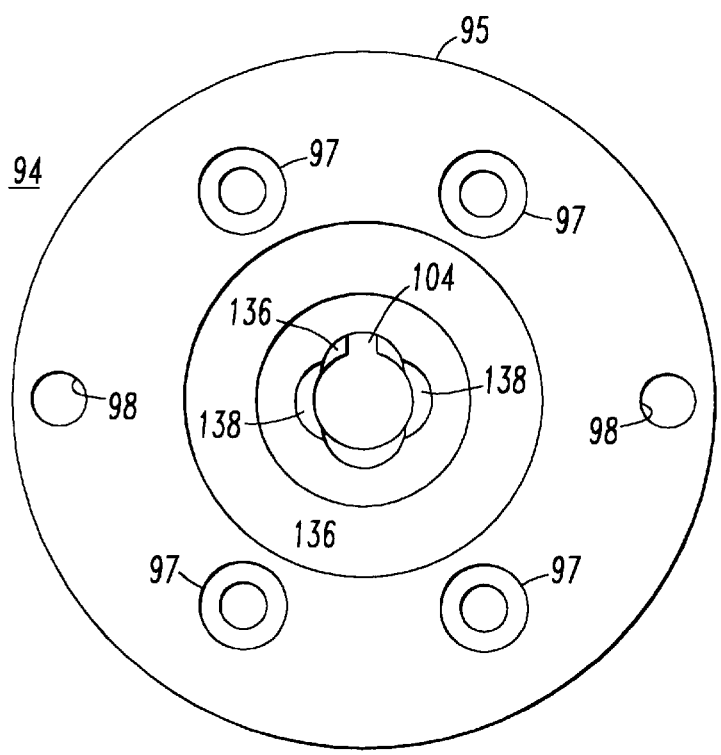
FIG. 8 is an end view of the drive axle illustrated in FIG. 7.

Splined shaft 72 has a keyway 100 into which is placed a key 101, which mates with a keyway 104 in sleeve 96, seen in FIG. 8. The key 101 allows torsional forces to be passed from the shaft 72 to the drive axle 94 and also allows axial movement between the two components.

The shaft 72 is biased for axial movement by means of a compression spring 106, having one end bearing against an end of shaft 72 and another end which bears against washer 108. The washer 108 is prevented from moving against action of the spring 106 by means of a retaining ring 110 which is inserted into a shallow groove (not illustrated) in sleeve 96.

Axial movement of shaft 72 is effected by means of an extraction knob 112. More particularly, a shoulder screw 116 passes through an aperture 113 in the end 114 of extraction knob 112, also shown in FIG. 7A. The longitudinal dimension of shoulder screw 116 is such that its threaded end threads into the end of shaft 72 while its head 117 rests against the end of extraction knob 112. If the shoulder screw 116 should become loose, it is prevented from falling out by means of a retaining ring 118 positioned within the extraction knob 112 and behind screw head 117. In addition, retaining ring 118 also pushes on screw head 117 during reinsertion of splined shaft 72 into the gear train 62 of drive assembly 60 (FIG. 5).

The key assembly 90 is of a well-known ball lock construction which includes a hollow cylinder 124 having a spring loaded internal rod with indentations near its distal end to accommodate radial movement of at least one projection, and preferably two diametrically opposed projections 126, commonly, ball bearings. Axial movement of the internal shaft is effected by a quick release mechanism which includes push button 128 located in handle 130. When the button is not depressed the projections are not aligned with the shaft indentations and are prevented from radial movement such that they protrude past the surface of cylinder 124 and are locked in that position.

The key assembly 90 may be inserted into a central aperture 131 of extraction knob 112 by first depressing button 128 allowing radial movement of projections 126. After insertion, button 128 is released and projections 126 are forced into one or more depressions, which in the embodiment of FIG. 7 are diametrically opposed apertures 132 in the wall portion 134 of extraction knob 112. Thereafter, with the key assembly 90 being firmly connected to extraction knob 112, splined shaft 72, connected to extraction knob 112, may be axially moved and extracted from the gear train by pulling on handle 130.

With additional reference to FIG. 8, the drive axle 94 has a first pair of diametrically opposed ledges 136 (at the 12 o'clock and 6 o'clock positions) which are formed within the sleeve portion 96. A second pair of diametrically opposed ledges 138 (at the 3 o'clock and 9 o'clock positions) are axially displaced from the first pair 136.

When the shaft 72 is to be extracted from the gear train, extraction knob 112, which is resting on ledges 136, is withdrawn by key assembly 90. In order to retrain the extraction knob 112 in the withdrawn position, the knob may be turned 90° such that the end 114 rests on ledges 138.

When the shaft 72 is to be reengaged with the gear train, the extraction knob 112 is pulled free of ledge 138 and again turned 90° and is drawn into sleeve 96, under action of spring 106, until it again rests on ledges 136.

Figure 9A:
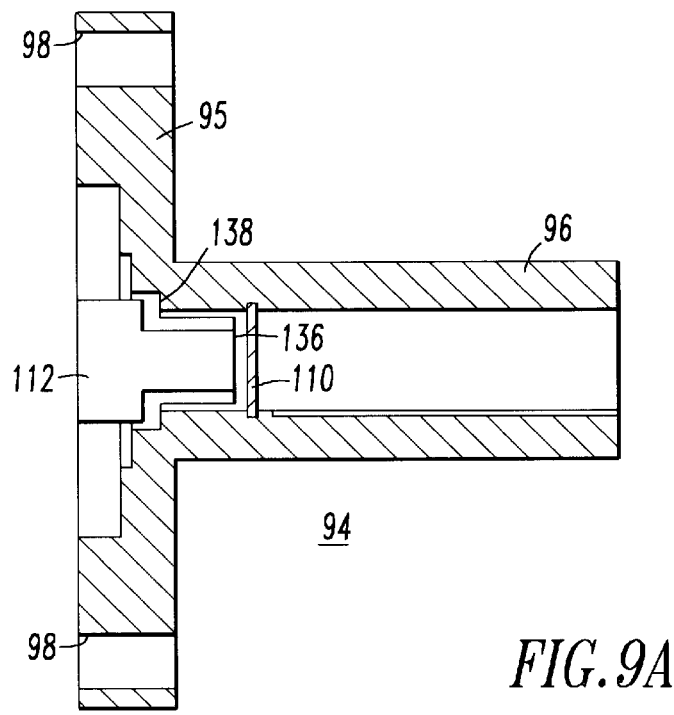
FIGS. 9A and 9B are sectional views illustrating two different positions of the extraction knob relative to the drive axle.
Figure 9B:
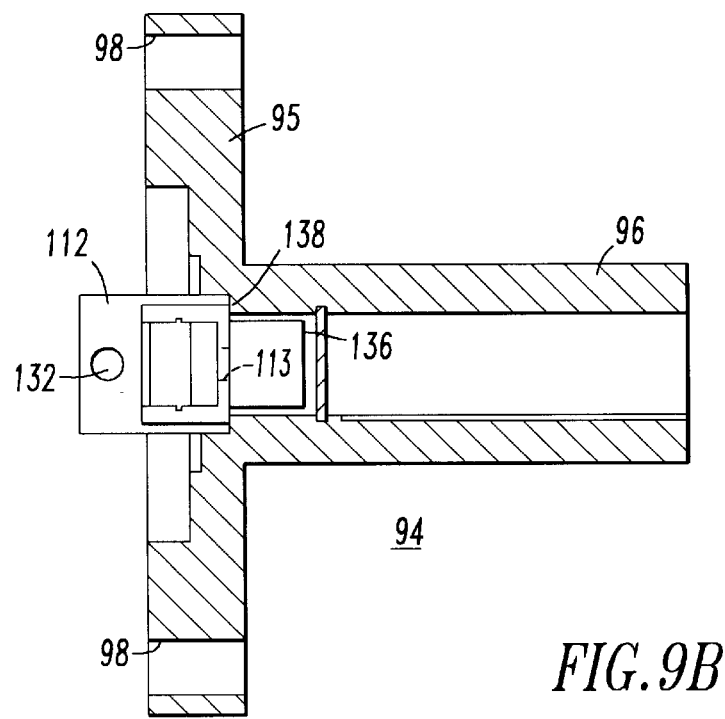

The inserted and extracted positions of the extraction knob 112 are further illustrated in the plan cross-sectional views of the drive axle 94 in FIGS. 9A and 9B. For simplicity, the shaft 72, shoulder screw 116, etc. are not shown. In FIG. 9A, with the extraction knob 112 in the first position, the drive shaft 72 would be engaged with the gear train 62 (FIG. 5) for normal vehicle operation. In FIG. 9B, with the extraction knob 112 in the second position, the drive the drive shaft 72 would be disengaged from the gear train 62 for free-wheeling operation. In the event the wheel 70 must be removed from the drive axle 94, there would be no (FIG. 9A) or very little (FIG. 9B) axial projection of the extraction knob 112 past the end of drove axle 94.

Figure 10:
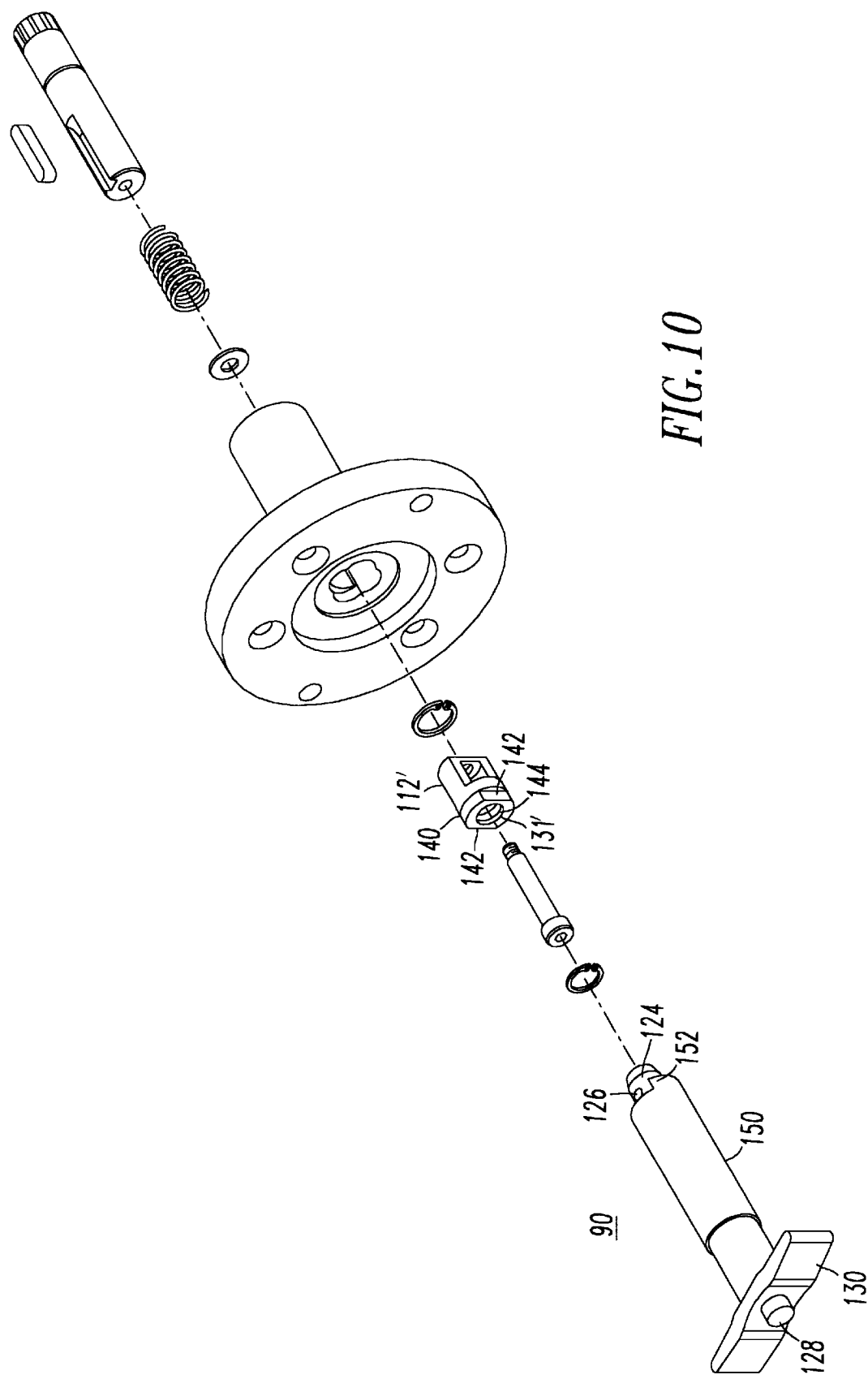
FIG. 10 illustrates another embodiment of the drive shaft assembly.

FIG. 10 illustrates another embodiment of the invention and, except for a modified key assembly and extraction knob, is identical to the arrangement shown in FIG. 7 The modified extraction knob 112' includes and end portion 140 having flat sides 142 and an internal circumferential groove 144. The modified key assembly 90' includes an outer sleeve 150 covering cylinder 124 and having a notch 152 at its distal end.

When inserting the key assembly 90' into the extraction knob 112', notch 152 is aligned with flat sides 142 and button 128 is depressed allowing projections 126 to line up with groove 144 and to lock in place after button release. Since projections 126 are received in a circumferential groove 144, as opposed to holes (132) as in FIG. 7, projections 126 do not have to be precisely centered within the notch 152. After the key assembly 90' is locked in place, the extraction knob 112' may be axially moved and turned 90° by virtue of the end of notched sleeve 150 engaging the flat side portions 142.

Although the present invention has been described with a certain degree of particularity, it is to be understood that various substitutions and modifications may be made without departing from the spirit and scope of the invention as defined in the appended claims. For example, the concepts described herein may be applied to vehicles with or without a forward and aft auxiliary chassis, as well as to vehicles having two or more drive assemblies per side.

What is claimed is:

1. A disengagable drive arrangement for an all terrain vehicle having both tracks and wheels, comprising:
   (A) a drive assembly;
   (B) a drive shaft assembly including a drive shaft which is engageable and disengageable with said drive assembly;
   (C) a wheel connected to said drive shaft assembly and adapted to be rotated thereby;
   (B) a track drive sprocket connected to said drive shaft assembly and adapted to be rotated thereby;
   (E) a key assembly insertable into said drive shaft assembly and operable to move said drive shaft into a selected one of an engageable and disengageable positions with said drive assembly; and
   (F) said key assembly having a quick release mechanism to allow said key assembly to be completely removed from said drive shaft assembly.

2. Apparatus according to claim 1 wherein:
   (A) said drive shaft assembly has a drive axle which extends along a central longitudinal axis and includes i) a flange portion to which said wheel and track drive sprocket are attached, and ii) a coaxial sleeve portion; and wherein
   (B) said drive shaft is axially moveable within said sleeve portion and includes means at an end thereof which is engageable and disengagable with said drive assembly;
   (C) an extraction knob connected to said drive shaft and axially moveable from a first position, where said drive shaft is engaged with said drive assembly, to a second position, where said drive shaft is disengaged with said drive assembly; and
   (D) means for retaining said extraction knob in a selected one of said first and second positions.

3. Apparatus according to claim 2 wherein:
   (A) said drive assembly includes a motor driven gear train having an output gear with a splined central aperture;
   (B) said drive shaft includes a splined end which mates with said splined central aperture of said drive shaft;
   (C) said drive shaft and said sleeve have matching keyways; and which includes
   (D) a key member disposed in said matching keyways to permit torsional forces to be passed from said shaft to said drive axle, while allowing for axial movement therebetween.

4. Apparatus according to claim 2 wherein:
   (A) said extraction knob has a wall portion defining a central aperture, with said wall portion including at least one radially extending cavity;
   (B) said key assembly having an end which includes at least one radially moveable projection, and which is insertable into said central aperture, whereby said projection extends into said cavity in said wall portion, allowing said extraction knob to be axially moved and rotated about said axis by said key assembly.

5. Apparatus according to claim 4 wherein:
   (A) said wall portion of said extraction knob has diametrically opposed apertures;
   (B) said key assembly has two said projections which respectively protrude into said diametrically opposed apertures allowing movement of said extraction knob both along and around said central longitudinal axes.

6. Apparatus according to claim 4 wherein:
   (A) said wall portion of said extraction knob has an internal circumferential groove;
   (B) said key assembly has two said projections which respectively protrude into said internal circumferential groove allowing movement of said extraction knob along said central longitudinal axis;
   (C) said wall portion of said extraction knob having flat side portions;
   (D) said key assembly has a notched end which is mateable with said flat portions allowing movement of said extraction knob around said central longitudinal axis.

7. Apparatus according to claim 2 wherein:
   (A) said means for retaining said extraction knob in said first position includes a first pair of diametrically opposed ledges formed within said sleeve portion of said drive axle and upon which an end of said extraction knob rests.

8. Apparatus according to claim 7 wherein:
   (A) said means for retaining said extraction knob in said second position includes a second pair of diametrically opposed ledges displaced from said first pair and upon which an end of said extraction knob rests.

9. Apparatus according to claim 8 wherein:
   (A) said first and second pair of ledges are oriented 90° relative to one another.

10. Apparatus according to claim 2 wherein:
    (A) said drive shaft is spring biased for axial movement.

11. Apparatus according to claim 1 wherein:
    (A) said all terrain vehicle is a remotely controlled unmanned ground vehicle.

12. Apparatus according to claim 11 wherein:
(A) said vehicle includes two said drive assemblies;
(B) one of said drive assemblies being located on the front on one side of said vehicle, and the other said drive assembly being located on the rear of the other side of said vehicle.

13. A disengagable drive arrangement for an all terrain vehicle having both tracks and wheels, comprising:
(A) a drive assembly;
(B) a drive shall assembly extending along a longitudinal axis and including i) a drive axle having a flange portion and ii) a coaxial sleeve portion;
(C) a drive shaft axially moveable within said sleeve portion and including means at an end thereof which is engageable and disengagable with said drive assembly;
(D) an extraction knob connected to said drive shaft and axially moveable from a first position, where said drive shaft is engaged with said drive assembly, to a second position, where said drive shaft is disengaged with said drive assembly;
(E) means for retaining said extraction knob in a selected one of said first and second positions;
(F) said extraction knob having a wall portion defining a central aperture, with said wall portion including at least one radially extending cavity;
(G) a key assembly having an end which includes at least one radially moveable projection, and which is insertable into said central aperture, whereby said projection extends into said cavity in said wall portion, allowing said extraction knob to be axially moved and rotated about said axis by said key assembly;
(H) said key assembly including a release mechanism allowing inward radial movement of said projection to permit decoupling of said key assembly from said extraction knob;
(I) a wheel connected to said drive axle to be rotated thereby; and
(J) a track drive sprocket connected to said drive axle to be rotated thereby.

* * * * *